US008981654B2

(12) United States Patent
Zhang et al.

(10) Patent No.: US 8,981,654 B2
(45) Date of Patent: Mar. 17, 2015

(54) LED CENTRALIZED DC POWER SUPPLY SYSTEM AND OPERATING METHODS THEREOF

(75) Inventors: Bo Zhang, Guangdong (CN); Guidong Zhang, Guangdong (CN); Wenxun Xiao, Guangdong (CN); Dongyuan Qiu, Guangdong (CN)

(73) Assignee: South China University of Technology, Tianhe Guangzhou, Guangdong (CN)

( * ) Notice: Subject to any disclaimer, the term of this patent is extended or adjusted under 35 U.S.C. 154(b) by 0 days.

(21) Appl. No.: 13/512,704

(22) PCT Filed: Apr. 16, 2011

(86) PCT No.: PCT/CN2011/072899
§ 371 (c)(1),
(2), (4) Date: Jun. 20, 2012

(87) PCT Pub. No.: WO2012/058904
PCT Pub. Date: May 10, 2012

(65) Prior Publication Data
US 2013/0207562 A1    Aug. 15, 2013

(30) Foreign Application Priority Data

Nov. 2, 2010   (CN) .......................... 2010 1 0528546

(51) Int. Cl.
*H05B 37/02*   (2006.01)
*H05B 33/08*   (2006.01)

(52) U.S. Cl.
CPC ............ *H05B 37/02* (2013.01); *H05B 33/0827* (2013.01)
USPC ............ 315/201; 315/224; 315/251; 315/219

(58) Field of Classification Search
CPC ................................ H05B 37/02; H05B 37/00
USPC .................. 315/224, 251, 219, 276, 287, 201; 363/44, 89, 8
See application file for complete search history.

(56) References Cited

U.S. PATENT DOCUMENTS 5,962,984 A * 10/1999 Mashburn et al. ......... 315/200 A
6,034,489 A *  3/2000 Weng ............................ 315/307
(Continued)

OTHER PUBLICATIONS

Author: P.Karutz, S.D Round, M.L Heldwein and J.W.Kolar, Title:Ultra Compact Three phase PWM rectifier, Date Dec. 2007.*
(Continued)

*Primary Examiner* — Douglas W Owens
*Assistant Examiner* — Wei Chan
(74) *Attorney, Agent, or Firm* — Nixon Peabody LLP; Jeffrey L. Costellia

(57) ABSTRACT

The invention provides a light emitting diode (LED) centralized DC (direct-current) power supply system and operating methods thereof. The proposed DC power supply system comprises a three-phase AC (alternating-current) input interface, a DC power supply output interface, N+1 three-phase PWM (pulse width modulation) rectifier modules, LED cluster loads and a power supply management module. The proposed operating methods are described as following: the power supply management module adjusts the duty ratio of the three-phase PWM rectifier modules, based on the control signals formed by synthesizing the information about voltage and current of the positive and negative output buses, the three-phase AC input ends, control signals and output of the three-phase PWM rectifier modules, hence AC voltage of power grid can be directly converted into adjustable DC voltage by the PWM rectifier.

5 Claims, 3 Drawing Sheets

(56) References Cited

U.S. PATENT DOCUMENTS

| | | | |
|---|---|---|---|
| 6,043,997 A * | 3/2000 | He et al. | 363/44 |
| 6,906,474 B2 * | 6/2005 | Trestman et al. | 315/224 |
| 7,015,658 B2 * | 3/2006 | Tsay et al. | 315/307 |
| 7,157,863 B2 * | 1/2007 | Eckert | 315/224 |
| 7,276,859 B1 * | 10/2007 | Trestman | 315/224 |
| 7,738,268 B2 * | 6/2010 | Baudesson et al. | 363/39 |
| 7,852,009 B2 * | 12/2010 | Coleman et al. | 315/185 S |
| 7,902,771 B2 * | 3/2011 | Shteynberg et al. | 315/307 |
| 2004/0085032 A1 * | 5/2004 | Eckert | 315/291 |
| 2005/0067974 A1 * | 3/2005 | Trestman et al. | 315/224 |
| 2006/0238143 A1 * | 10/2006 | Uematsu et al. | 315/307 |
| 2007/0090767 A1 * | 4/2007 | Roberts | 315/139 |
| 2007/0194724 A1 * | 8/2007 | Ishii et al. | 315/291 |
| 2010/0231136 A1 * | 9/2010 | Reisenauer et al. | 315/276 |
| 2011/0080111 A1 * | 4/2011 | Nuhfer et al. | 315/291 |
| 2012/0256547 A1 * | 10/2012 | Yang | 315/144 |

OTHER PUBLICATIONS

Author: HV9910, Title: Universal High Brightness LED Driver Date Dec. 2004.*

Author: Muhammad H. Rashid, Title:Power Electronics Handbook, Date:Dec. 2001.*

* cited by examiner

LED CENTRALIZED DC POWER SUPPLY SYSTEM AND OPERATING METHODS THEREOF

FIELD OF THE INVENTION

The invention relates to the technical field of power supply systems, in particular relates to a light emitting diode (LED) centralized DC (direct-current) power supply system and its operating methods.

DESCRIPTION OF THE RELATED ART

The power of LED drivers is normally less than hundreds of watts, and each set of LED lamp integrates an independent power supply and an LED cluster, as shown in FIG. 1. Such power supplying mode has the following problems: firstly, the position and radiator of the power supply should be considered in the lamp design, which results in larger size and higher cost, hence the lamp design is limited by the power supply; secondly, the whole lamp will be out of use once the power supply is damaged, which causes high cost and short service life; finally, unified light adjustment of a plurality of LEDs is difficult to be realized.

In view of the above defects, the invention provides an LED centralized DC power supply system to solve the above problems.

SUMMARY OF THE INVENTION

The object of the invention is to provide an LED centralized DC power supply system and its operating methods for overcoming the above defects of the prior art. The invention is suitable for LED street lamp systems and the like, and can realize these functions such as: supplying power to the LED lamps by an outside centralized DC power supply system replacing the conventional supply mode wherein the power supply is set in the LED lamps; supplying power in N+1 redundancy mode, which realizes switching a redundant power supply during system fault or maintenance under the control of a power supply management module; and monitoring the N LED cluster loads. In the invention, there are these advantages of cost saving, convenience of power supply maintenance and power supply management, etc. The invention is realized through the following technical scheme:

A LED centralized DC power supply system comprises: a three-phase AC input interface; a power supply output interface having a positive output bus and a negative output bus; N+1 three-phase PWM rectifier modules, wherein each of N+1 three-phase PWM rectifier modules has a three-phase AC input end that is connected with said three-phase AC input interface, has a positive output end that is connected with said positive output bus, and has a negative output end that is connected with said negative output bus, wherein N is a natural number; LED cluster loads which are connected between said positive output bus and said negative output bus; and a power supply management module, connected with each of said N+1 three-phase PWM rectifier modules, detecting status of input and output of the power supply, and adjusting the duty ratio of said three-phase PWM rectifier modules.

In the LED centralized DC power supply system, the input phase voltage range of the three-phase AC input interface is from 90V to 264V.

Each of said N+1 three-phase PWM rectifier module comprises a three-phase PWM rectifier circuit, and the power supply management module, which is connected with the three-phase PWM rectifier modules, can adjust the three-phase PWM rectifier modules to output adjustable voltage.

Each of said LED cluster loads comprises a constant-current module and an LED cluster, the constant-current module and the LED cluster are connected in series, wherein the positive poles of the LED cluster loads are connected with the positive output bus, and the negative poles of the LED clusters, i.e. negative poles of LED cluster loads, are connected with the negative output bus.

Said power supply management module comprises a data collection module, a control module and a computer.

Said N+1 three-phase PWM rectifier modules and said power supply management module form a power supply device, which is installed in the center of the positive and negative output bus via which the power supply device supplies power to the LED cluster loads.

The operating methods of said LED centralized DC power supply system comprise the following steps: collecting data of output voltage and current of the positive output bus and the negative output bus, three-phase AC input voltage and current of the three-phase AC input ends of the three-phase PWM rectifier modules, and duty ratio and output of the three-phase PWM rectifier modules through the data collection module, then transmitting data to the computer for data processing; when the voltage or current of the positive and negative output buses are too high or too low, the control module will adjust the duty ratio of the three-phase PWM rectifier modules, thus to stabilize the output voltage and current of the positive and negative output buses at normal operating state; when the three-phase AC input voltage or current are too high or too low, the duty ratio of the three-phase PWM rectifier modules is adjusted to protect the power supply; and displaying parameters of the power supply on the computer.

In the operating methods, the duty ratios of the three-phase PWM rectifier modules can be adjusted according to the data displayed on the computer and comprehensive weather and road conditions, and thus to adjust the brightness of the LED cluster loads for energy conservation.

Compared with the prior art, the invention has the following advantages and effects:

Under equal condition of power, the cost is reduced comparing with current LED lamp which integrates an LED cluster and a power supply. The power supply is set outside of the LED lamp has these advantages such as greatly reducing the volume of the lamp, making the lamp design more flexible, avoiding the waste of the whole lamp when the service life of the power supply is shorter than that of the LED cluster, and enlarging the radiator space of the LED cluster to prolong the service life of the LED cluster.

The input phase voltage of the three-phase AC input interface ($U_a$, $U_b$, $U_c$) is appropriate in all levels from 90V to 264V, and the output voltage of the three-phase PWM rectifier modules is controllable and is suitable for LED cluster loads of different voltage levels. The power supply output interface comprises a positive bus (+) and a negative bus (−).

Redundancy supply of N+1 power supplies is realized through the N+1 three-phase PWM rectifier modules, so that the whole LED system is very reliable, and the maintenance of the power supply is very convenient. Each of the N+1 three-phase PWM rectifier modules has three-phase AC input ends which are respectively and correspondingly connected with the three-phase AC input interface (Ua, Ub, Uc) from top to bottom, has a positive (+) output end connected with the positive output bus, has a negative (−) output end connected with the negative output bus, has a three-phase PWM rectifier which realizes adjustable output voltage and PFC (power factor correction) through PWM adjustment of the module.

The power supply device being installed in the center of the positive and negative output bus can effectively control line loss, so the line loss is less.

In conclusion, the invention has the following advantages and effects: presently, the power of LED drivers is normally less than hundreds of watts, and each set of LED lamp integrates an independent power supply and an LED cluster, as shown in FIG. 1. Such power supplying mode has the following problems: firstly, the position and radiator of the power supply should be considered in the lamp design, which results in larger size and higher cost, hence the lamp design is limited by the power supply; secondly, the whole lamp will be out of use once the power supply is damaged, which causes high cost and short service life; finally, unified light adjustment of a plurality of LEDs is difficult to be realized. The invention solves the above problems by converting AC voltage of power grid into adjustable DC voltage through PWM rectifier, and supplying power, which can reach dozes of kilowatts, to the LEDs on the whole line.

DETAILED DESCRIPTION OF THE PREFERRED EMBODIMENT

The preferred embodiment of the invention is further described by combining the drawings and is in no way intended to limit the invention.

Figure 1:
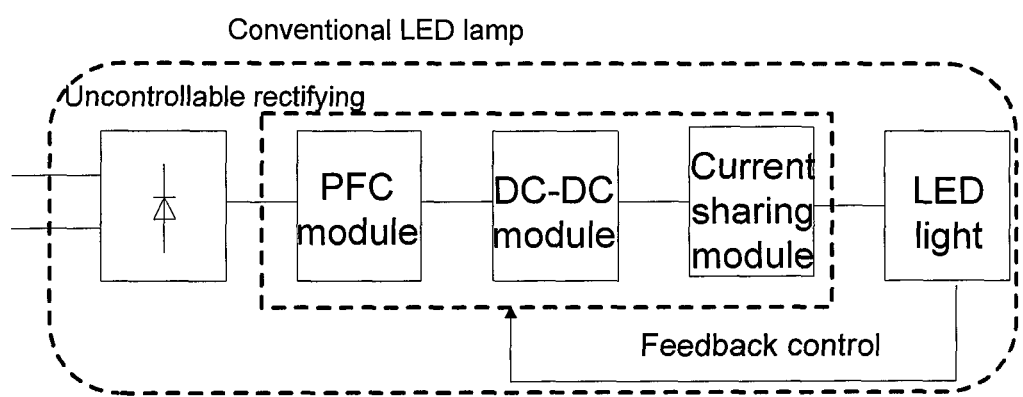
FIG. 1 is a block diagram of a conventional LED lamp inner integrating a power supply and an LED cluster.
Figure 2:
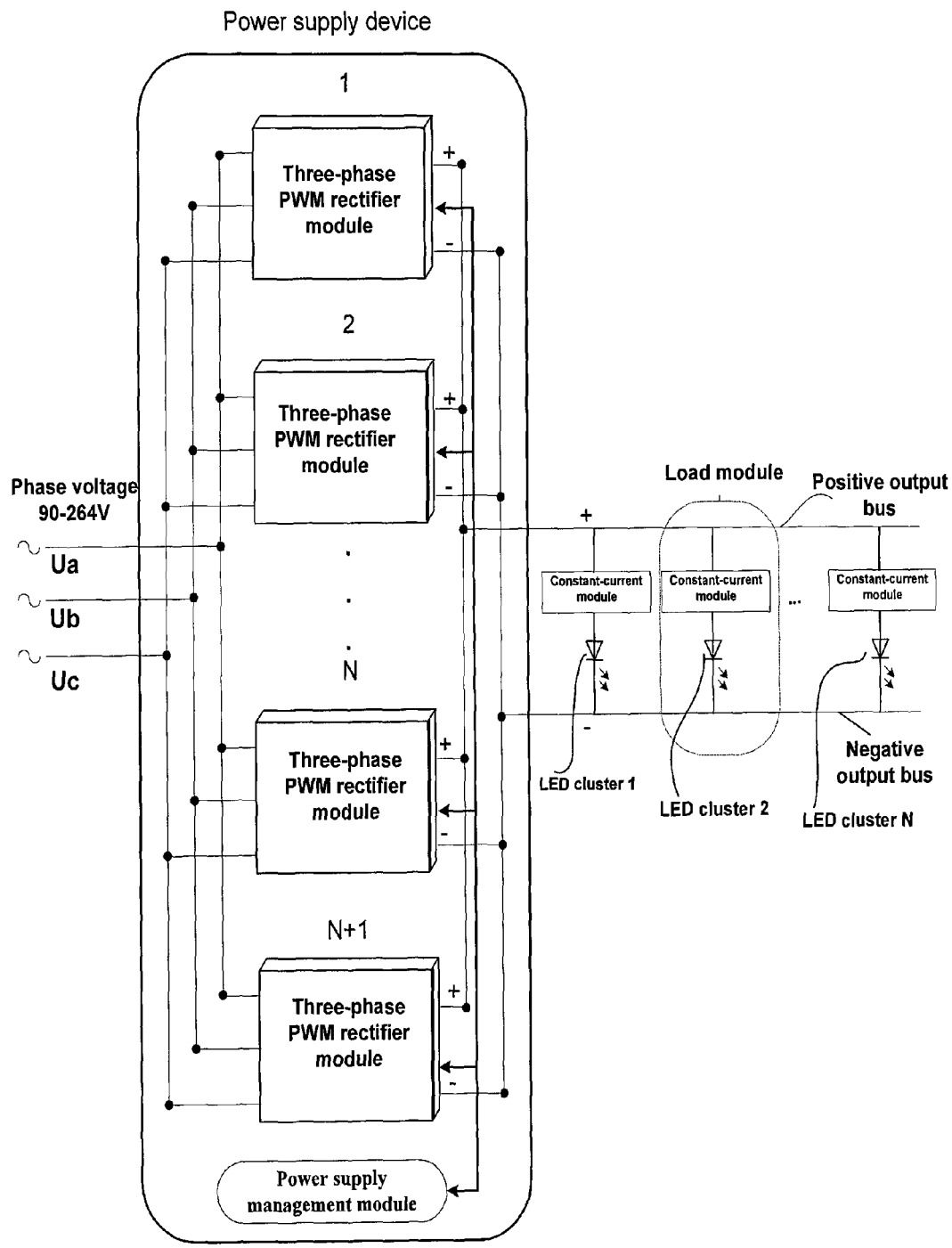
FIG. 2 is a block diagram of an LED centralized DC power supply system of the embodiment of the invention.

In FIG. 2, the invention provides an LED centralized DC power supply system, which comprises: a three-phase AC input interface; a power supply output interface having a positive output bus and a negative output bus; N+1 three-phase PWM rectifier modules, wherein each of N+1 three-phase PWM rectifier modules has a three-phase AC input end that is connected with said three-phase AC input interface, has a positive output end that is connected with said positive output bus, and has a negative output end that is connected with said negative output bus, wherein N is a natural number; LED cluster loads which are connected between said positive output bus and said negative output bus; and a power supply management module, connected with each of said N+1 three-phase PWM rectifier modules, detecting status of input and output of the power supply, and adjusting the duty ratio of said three-phase PWM rectifier modules.

The LED centralized DC power supply system converts the AC voltage of power grid into adjustable DC voltage, and the range of output power of the system is from dozens of kilowatts to hundreds of kilowatts or higher, so can meet needs for supplying directly all LED lines. Under the control of the power management module, the LED centralized DC power supply system realizes the functions of switching a redundant power supply during system faults or maintenance, and monitoring the LED cluster loads.

As shown in FIG. 2, the input phase voltage of the three-phase AC input interface ($U_a$, $U_b$, $U_c$) is appropriate in all levels from 90V to 264V, and the output voltages of the three-phase PWM rectifier modules are controllable and meet needs of LED clusters of different voltage levels. The power supply output interface has a positive bus (+) and a negative bus (−). Redundancy supply of N+1 power supplies is realized with the N+1 three-phase PWM rectifier modules, hence the whole LED system is very reliable, and the maintenance of the power supply is very convenient. Each of the N+1 three-phase PWM rectifier modules has three-phase AC input ends which are respectively and correspondingly connected with the three-phase AC input interface ($U_a$, $U_b$, $U_c$) from top to bottom, has a positive (+) output end connected with the positive output bus, and has a negative (−) output end connected with the negative output bus, has a three-phase PWM rectifier which realizes adjustable output voltage and PFC (power factor correction) through PWM adjustment of the module.

The LED cluster loads are connected between the positive output bus and the negative output bus. Each of the LED cluster loads comprises a constant-current module and an LED cluster, the constant-current module and the LED cluster are connected in series, wherein the positive poles of the LED cluster loads are connected with the positive output bus, and the negative poles of the LED clusters, i.e. negative poles of LED cluster loads, are connected with the negative output bus. The constant-current module can be any mature circuit, such as HV9910, HV9912 both produced by Supertex company, and each LED cluster only needs one constant-current control module to realize constant-current operation.

It is easier to realize power supply management in a centralized power supply. In practical application, the power supply management module comprises a data collection module, a control module, a computer and control software. The data of output voltage and current of the positive and negative output buses, the voltage and current of the three-phase AC input ends, and control signal and output of the three-phase PWM rectifier modules are collected by the data collection module. After processing data in the background, control signals are generated and sent to the three-phase PWM rectifier modules for adjusting output voltage and current. When the detected three-phase AC input voltage or current are too high or too low (not in the predetermined range), the system forbids the three-phase PWM rectifier modules to work by adjusting the duty ratio of the three-phase PWM rectifier modules to be zero, and an alarm signal is sent out; when the detected output voltage or current of the positive and negative output buses exceed a certain value, the system decreases the duty ratios (control quantity) of the three-phase PWM rectifier modules to insure normal power supply for loads, and an alarm signal is sent out in necessary to warn operators; furthermore, according to weather and road conditions, operators can adjust the duty ratios of the three-phase PWM rectifier modules for avoiding overhigh brightness of the LED, thus to avoid waste and obtain the effect of energy conservation.

Figure 3:
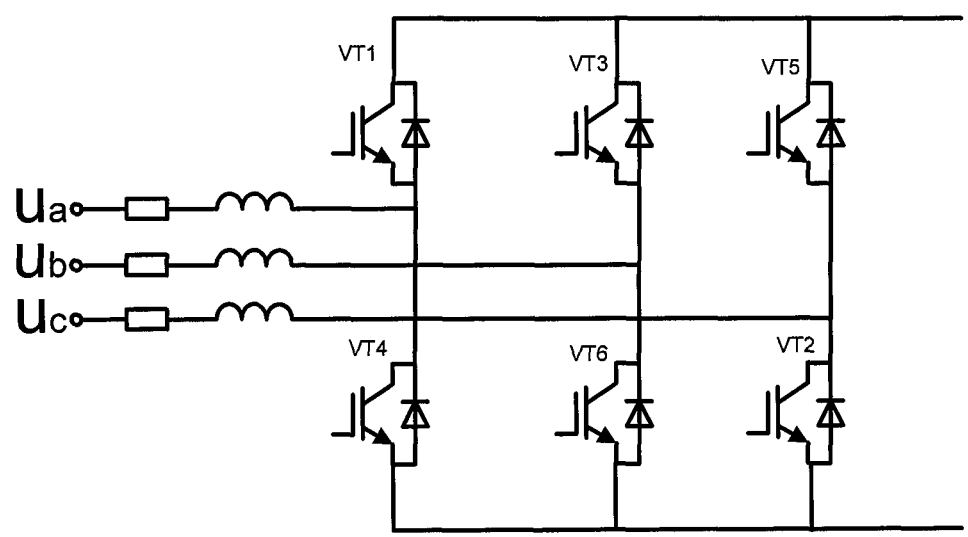
FIG. 3 is a PWM three-phase rectifier circuit diagram of the PWM three-phase rectifier module shown in FIG. 2.

FIG. 3 shows a circuit diagram of three-phase PWM rectifier of an LED centralized DC power supply of the invention, in which $U_a$, $U_b$ and $U_c$ are three-phase input ends, $V_{T1}$, $V_{T2}$, $V_{T3}$, $V_{T4}$, $V_{T5}$ and $V_{T6}$ are six switches, which form a three-phase bridge circuit. The three-phase input ends are respectively connected with the middle points of three bridge arms to form a three-phase PWM rectifier circuit.

As describe above, the LED centralized DC power supply system of the invention directly converts AC voltage of power grid into adjustable DC voltage through the PWM rectifier, wherein the output power, which range from dozens of kilowatts to hundreds of kilowatts or higher, can meet needs for supplying directly the LED cluster loads on the whole line.

The invention claimed is:

1. A LED centralized DC power supply system, comprising:
   a three-phase AC input interface;
   a power supply output interface having a positive output bus and a negative output bus;
   N+1 three-phase PWM rectifier modules, wherein each of N+1 three-phase PWM rectifier modules has a three-phase AC input end that is connected with said three-phase AC input interface, has a positive output end that is connected with said positive output bus, and has a negative output end that is connected with said negative output bus, wherein N is a natural number;
   N LED cluster loads which are connected between said positive output bus and said negative output bus; and
   a power supply management module, connected with each of said N+1 three-phase PWM rectifier modules, detecting status of input and output of the power supply, and adjusting the duty ratio of said three-phase PWM rectifier modules;
   wherein said power supply management module comprises a data collection module, a control module and a computer, and
   wherein data of output voltage and current of said positive output bus and said negative output bus, three-phase AC input voltage and current of said three-phase AC input ends of said three-phase PWM rectifier modules, and duty ratio and output of said three-phase PWM rectifier modules is collected by said data collection module, and then said data is transmitted to said computer for data processing; and parameters of the power supply are displayed on said computer;
   wherein during said date processing, when the voltage or current of said positive output bus and said negative output bus are too high or too low, said control module will adjust the duty ratio of said three-phase PWM rectifier modules, thus to stabilize the output voltage and current of said positive and negative output buses at normal operating state; and when said three-phase AC input voltage or current are too high or too low, the duty ratio of said three-phase PWM rectifier modules will be adjusted to protect the power supply;
   wherein each of said N+1 three-phase PWM rectifier modules comprises a three-phase PWM rectifier circuit, and said power supply management module, which is connected with said three-phase PWM rectifier modules, adjusts said three-phase PWM rectifier modules to output adjustable voltage;
   wherein each of said N LED cluster loads comprises a constant-current module and an LED cluster, said constant-current module and said LED cluster are connected in series, wherein the positive poles of said N LED cluster loads are connected with said positive output bus, and the negative poles of said LED clusters, which are also the negative poles of said N LED cluster loads, are connected with said negative output bus;
   wherein a power supply device, which consists of said N+1 three-phase PWM rectifier modules and said power supply management module, is installed in the center of said positive and negative output bus via which said power supply device supplies power to said N LED cluster loads.

2. The LED centralized DC power supply system of claim 1, wherein the input phase voltage range of said three-phase AC input interface is from 90V to 264V.

3. An operating method of the LED centralized DC power supply system claimed in claim 1, comprising: collecting data of output voltage and current of said positive output bus and said negative output bus, three-phase AC input voltage and current of said three-phase AC input ends of said three-phase PWM rectifier modules, and duty ratio and output of said three-phase PWM rectifier modules through said data collection module, then transmitting data to said computer for data processing; and displaying parameters of the power supply on said computer,
   wherein during said date processing, when the voltage or current of said positive output bus and said negative output bus are too high or too low, said control module will adjust the duty ratio of said three-phase PWM rectifier modules, thus to stabilize the output voltage and current of said positive and negative output buses at normal operating state; when said three-phase AC input voltage or current are too high or too low, the duty ratio of said three-phase PWM rectifier modules is adjusted to protect the power supply;
   wherein the duty ratios of said three-phase PWM rectifier modules can be adjusted according to the data displayed on said computer and comprehensive weather and road conditions, and thus to adjust the brightness of said N LED cluster loads for energy conservation.

4. The operating method of claim 3, wherein when the detected three-phase AC input voltage or current are too high or too low, the system forbids said three-phase PWM rectifier modules to work by adjusting the duty ratio of said three-phase PWM rectifier modules to zero, and an alarm signal is sent out.

5. The operating method of claim 3, wherein when the detected output voltage or current on said positive and negative output buses exceed a certain value, the system decreases the duty ratios of said three-phase PWM rectifier modules.

* * * * *